United States Patent

Wakamiya

Patent Number: 4,501,552
Date of Patent: Feb. 26, 1985

[54] METHOD FOR CONTROLLING FURNACE TEMPERATURE

[75] Inventor: Yoshinori Wakamiya, Kobe, Japan

[73] Assignee: Mitsubishi Denki Kabushiki Kaisha, Tokyo, Japan

[21] Appl. No.: 530,439

[22] Filed: Sep. 8, 1983

[30] Foreign Application Priority Data

Sep. 8, 1982 [JP]  Japan .................................. 57-157727

[51] Int. Cl.³ .............................................. B21B 37/10
[52] U.S. Cl. ......................................... 432/49; 72/13; 236/15 BB; 364/477
[58] Field of Search ...................... 236/15 BB, 15 BF; 364/557, 477; 432/49, 18; 362/472, 477; 72/8, 13

[56] References Cited

U.S. PATENT DOCUMENTS

| 4,004,138 | 1/1977 | Morooka et al. | 364/477 |
| 4,373,364 | 2/1983 | Tanimoto et al. | 364/477 X |
| 4,394,121 | 7/1983 | Wakamiya et al. | 432/18 X |

Primary Examiner—William E. Wayner
Attorney, Agent, or Firm—Sughrue, Mion, Zinn, Macpeak & Seas

[57] ABSTRACT

In controlling furnace temperature, a desired temperature profile of a slab in a direction along its movement through a furnace is calculated by using an expression for total fuel flow as a function of slab temperature and minimizing the total fuel flow. The present slab temperature is calculated by using the distribution of present gas temperatures in the furnace. The heating of the furnace is adjusted based on the temperature difference between the present slab temperature and a desired temperature.

2 Claims, 5 Drawing Figures

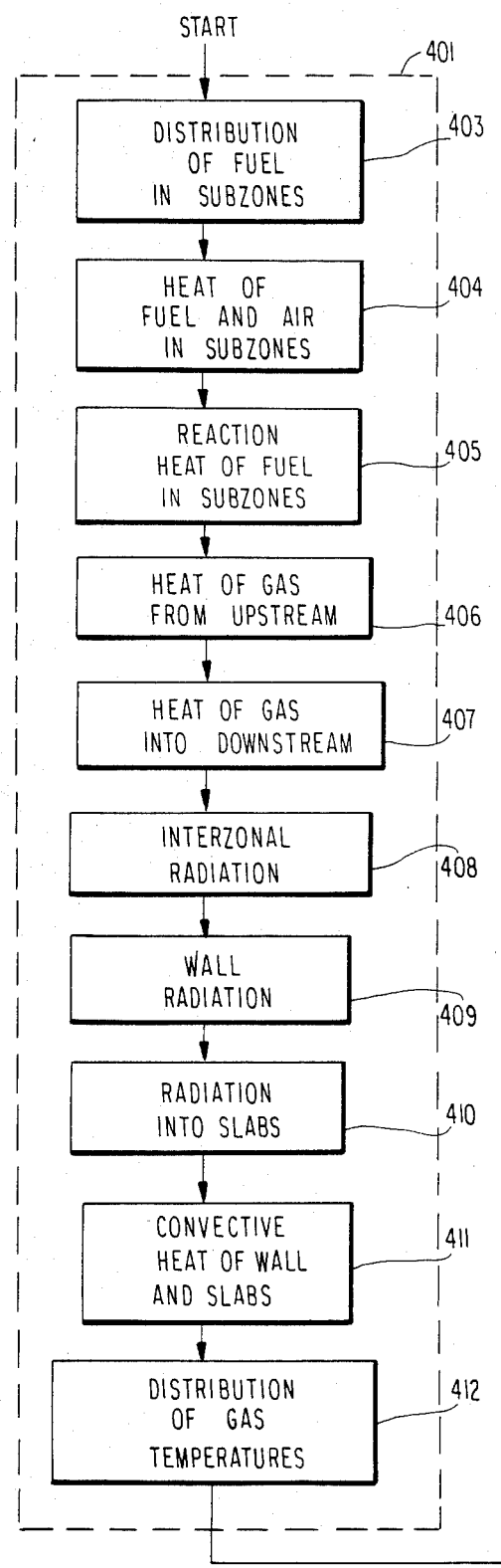
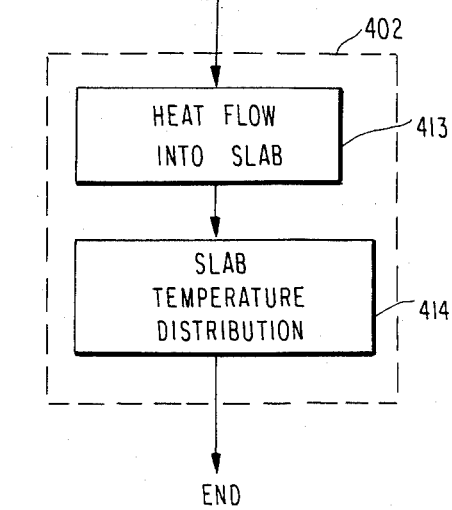
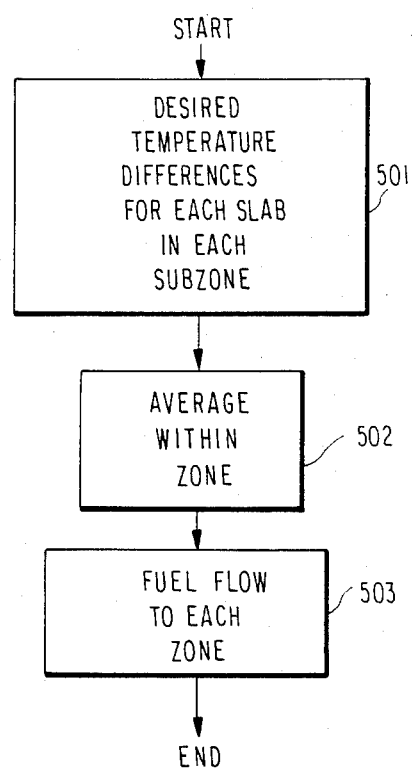
FIG. 4
FIG. 5

METHOD FOR CONTROLLING FURNACE TEMPERATURE

BACKGROUND OF THE INVENTION

This invention relates to the method for controlling furnace temperature and more particularly to the method for controlling the temperature of a furnace having multiple zones for continuous heating of slabs to a predetermined value suitable for hot rolling in hot strip rolling mills.

DESCRIPTION OF THE PRIOR ART

In a conventional method for controlling temperature of a furnace, the temperature of the furnace is controlled by using the temperature of each zone of the furnace calculated by multiplying weight coefficients by a temperature profile of the furnace. The temperature profile is obtained by using a desired temperature at a discharge point of the furnace and a present temperature of each slab, which is produced based on slab shape information such as thickness, width and length, and a detected temperature of the furnace using a thermocouple.

In the above-described conventional method, the relation between the temperature of the furnace and the temperature of the slab is used, but the relation between the amount of fuel and the temperature of the slab or of the furnace is not used for controlling of the output of the heat in the furnace.

Accordingly, since the temperature profile of the furnace is not used to determine the total fuel flow, a furnace with high efficiency cannot be obtained with this method.

SUMMARY OF THE INVENTION

It is an object of this invention to provide a new and improved method of controlling furnace temperature which is able to minimize total injected fuel flow into a furnace.

This object is accomplished by providing such a method, wherein a desired temperature curve of a slab within each subzone is calculated to minimize total fuel flow by using the information of the shape of the slab, and both the slab temperature at an intermediate position of the furnace and the predetermined slab temperature at the discharge position of the furnace are used to predict a distribution of gas temperature in each subzone along the length of the furnace. A slab temperature distribution is calculated by using the distribution of the gas temperature predicted previously. The slab temperature calculated previously for the present time is compared with the desired slab temperature to produce a difference between them. The output of the heating means is adjusted according to the temperature difference.

BRIEF DESCRIPTION OF THE DRAWINGS

FIG. 4 is a flow diagram for calculating the slab temperature at the present time; and FIG. 5 is a flow diagram describing a fuel flow calculating unit.

DETAILED DESCRIPTION OF THE PREFERRED EMBODIMENT

Figure 1:
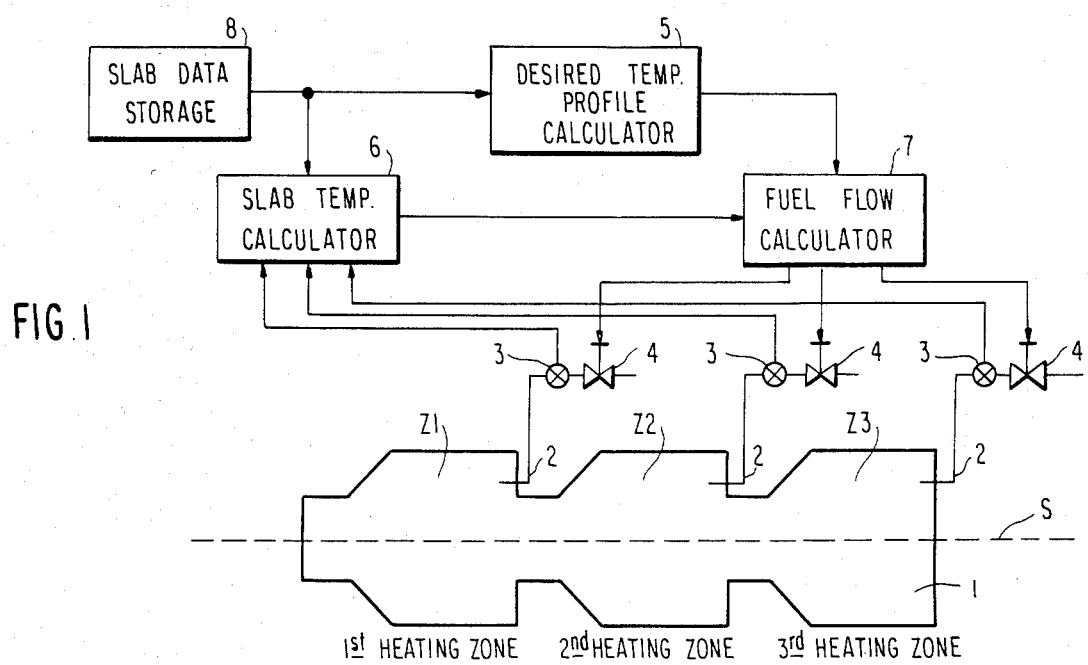
FIG. 1 is a schematic view of a three-zone heating furnace to which is applied a control method in accordance with the present invention.

In accordance with the embodiment of the invention shown in FIG. 1, a furnace comprises in this example three zones, a pre-heating zone Z1, a heating zone Z2, and a soaking zone Z3. Burners 2 in each zone are connected with fuel flow meters 3 and fuel control valves 4. A desired temperature curve calculating unit 5 calculates a temperature curve of a slab by using information of each slab's shape which is stored in a data storage circuit 8 of a computer according to a method to be described in detail later. A slab temperature calculating unit 6, which comprises two calculating units for furnace temperature and for slab temperature, calculates every second a temperature of each slab passing through the furnace 1 based on the fuel flow detected every second by the fuel flow meters 3. A fuel flow calculating unit 7 decides the fuel flow of each controlled zone Z1, Z2 and Z3 by comparing each desired slab temperature with each present calculated slab temperature.

Figure 2:
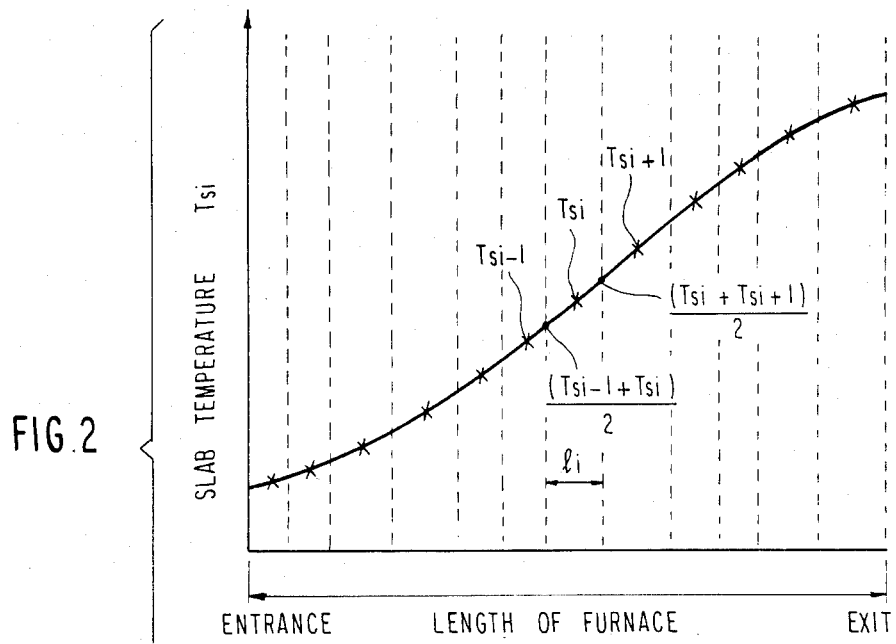
FIG. 2 is a graph of the desired slab temperature curve which is obtained with this invention.
Figure 2:
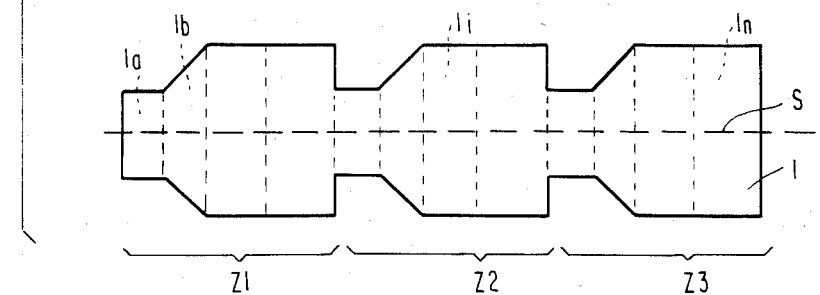

The desired temperature profile calculating unit 5 may be explained by using a model as shown in FIG. 2, wherein the furnace 1 is divided into plural subzones 1a, 1b, ... 1n, in the direction of the length of the furnace 1 in which a slab S moves. A gas temperature and an average slab temperature at the center of the ith zubzone are denoted as $T_{gi}$ and $T_{si}$, respectively. The total heat balance in the whole furnace may be expressed by the following equation $$Q_T = Q_1 + Q_2 + Q_3 \tag{1}$$

where $Q_T$ is the total quantity of heat obtained by burning the fuel, $Q_1$ is the quantity of heat lost from the furnace 1, $Q_2$ is the quantity of the heat absorbed by gas exhausted from the furnace 1, and $Q_3$ is the quantity of heat absorbed by the slab S.

The total quantity of heat $Q_T$ may also be expressed by using the fuel $W_i$ introduced into the ith subzone and expressed in the equation $$Q_T = \sum_{i=1}^{n} W_i \cdot H_g \tag{2}$$

where $H_g$ is a constant accounting for the heat of reaction which converts fuel flow into heat flow.

The heat loss quantity $Q_1$ from the furnace may be expressed by using constants $A_i$ and $B_i$ depending on the structure of the furnace and the gas temperature $T_{gi}$ at the center of the ith subzone as follows $$Q_1 = \sum_{i=1}^{n} (A_i \cdot T_{gi} + B_i) \tag{3}$$

The loss heat quantity $Q_2$ for the exhausted gas may be expressed as $$Q_2 = T_{gi} \cdot C_{pg} \cdot C \cdot \sum_{i=1}^{n} W_i \tag{4}$$

where $C_{pg}$ is the specific heat of the exhausted gas, and C is a constant which relates the volume of the exhaust gas to the total fuel flow.

The quantity of heat $Q_3$ absorbed by the slabs may be expressed as $$Q_3 = \sum_{i=1}^{n} D_i \cdot \{(T_{gi} + 273)^4 - (T_{si} + 273)^4\} \quad (5)$$

where $D_i$ is a constant for radiative heat exhange between the slab and the gas in the ith subzone.

Substituting equations (2) and (5) into equation (2), the following equation is obtained $$\sum_{i=1}^{n} W_i \cdot H_g = \sum_{i=1}^{n} (A_i \cdot T_{gi} + B_i) + T_{gl} \cdot C_{pg} \cdot C \cdot \sum_{i=1}^{n} W_i + \quad (6)$$

$$\sum_{i=1}^{n} D_i \{(T_{gi} + 273)^4 - (T_{si} + 273)^4\}$$

If consideration is restricted to the slab temperature within the ith subzone, the relation among the heat quantity $Q_{si}$ absorbed by the slab, the slab temperature $T_{in}$ upon entering the ith subzone and the slab temperature $T_{out}$ upon exiting may be expressed by the following equation $$D_i Q_{si} \cdot \frac{l_i}{v} = C_p \cdot \gamma \cdot H \cdot (T_{in} - T_{out}) \quad (7)$$

$$= C_p \cdot \gamma \cdot H \frac{(T_{si+1} - T_{si-1})}{2}$$

where $Q_{si}$ given by $$Q_{si} = D_i\{(T_{gi} + 273)^4 - (T_{si} + 273^4)\}$$

which is the radiative heat exhange and in which the subzone end temperatures $T_{in}$ and $T_{out}$ are averged between neighboring subzones, $$T_{in} = (T_{si-1} + T_{si})/2$$

$$T_{out} = (T_{si} + T_{si+1})/2,$$

The parameter $l_i$ is the length of the ith subzone, $v$ is the velocity of the slab through the subzone, $C_p$ the specific heat of the slab, $\gamma$ the specific gravity of the slab and $H$ the thickness of the slab. Because there is no heating in the first subzone $1a$, the slab temperature on the entrance side of the first subzone $1a$ equals the slab temperature on the exit side of the first subzone. Also the slab temperature on the exit side of the last subzone $1n$ equals the desired temperature of the discharged slab.

Equation (7) can be combined with the radiative heat exchange equation to yield $$T_{gi} = [(T_{si} - 273)^4 - E_i \cdot (T_{si+1} - T_{si-1})^{\frac{1}{4}}] - 273 \quad (8)$$

where $$E_i = \frac{C_p \cdot \gamma \cdot H \cdot v}{D_i \cdot l_1 \cdot 2} \quad (9)$$

The following equation (10) is derived by substituting the equations (7) and (8) into equation (6) and rearranging:

$$W_T = \frac{1}{(H_g - T_{gi} \cdot C_{pg} \cdot C)} \left[ \sum_{i=1}^{n} \{A_i \cdot [(T_{si} + 273)^4 + \right. \quad (10)$$

$$E_i(T_{si+1} - T_{si-1})]^{\frac{1}{4}} - 273 + B_i\} +$$

$$\left. \sum_{i=1}^{n} \frac{C_p \cdot \gamma \cdot H}{2 \cdot l_i} (T_{si+1} - T_{si-1}) \right],$$

where $W_T$ is the total fuel heat flow that may be expressed as $$W_T = \sum_{i=1}^{n} W_i.$$

In equation (10), the slab temperature $T_{si}$ in the ith subzone, which minimizes the total fuel flow for the entire furnace can be obtained by usual method of nonlinear optimization, in which the slab temperature $T_{si}$ calculated for each slab is stored in the memory of the computer to obtain the desired curve on each slab.

Figure 3:
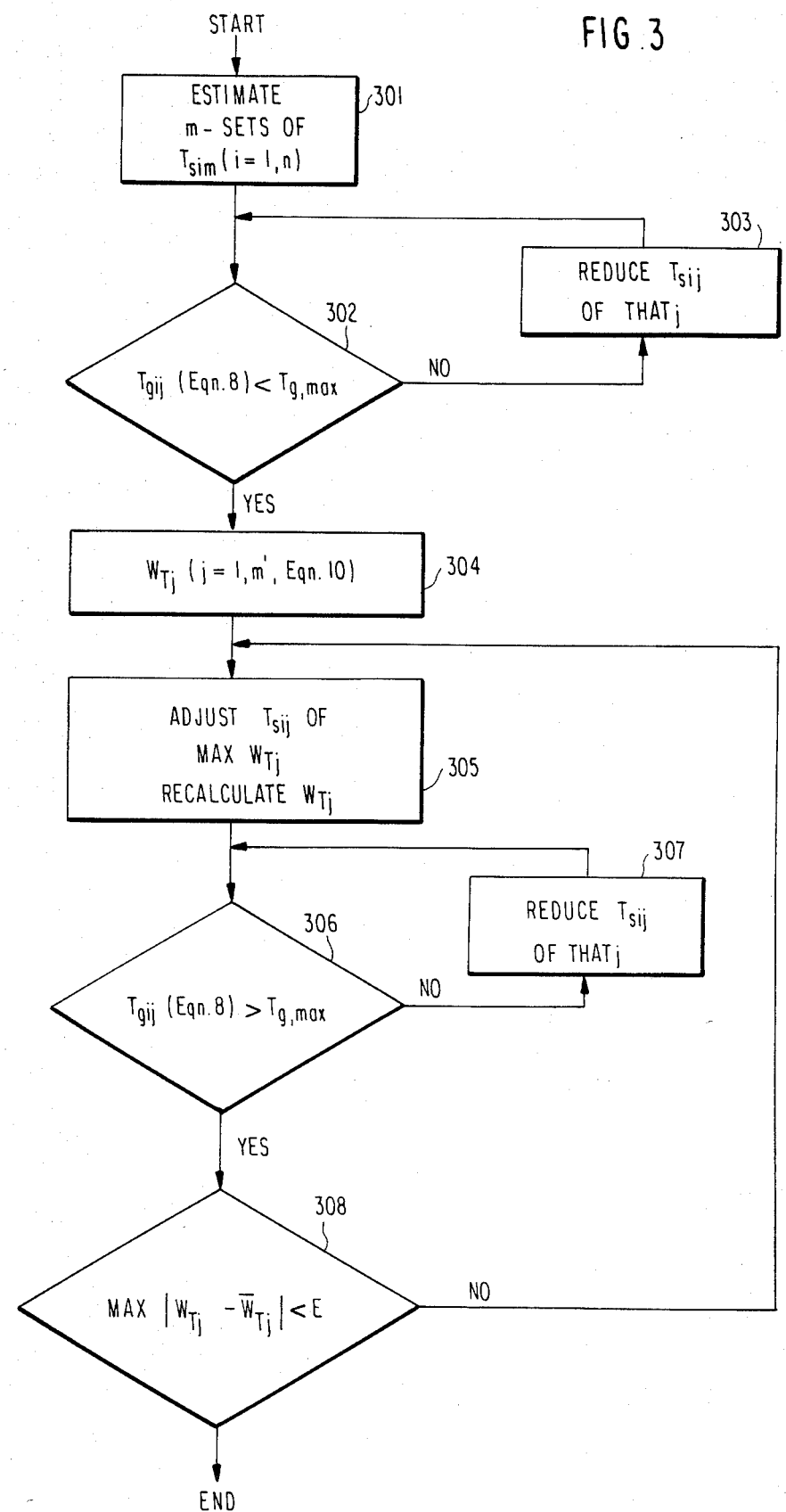
FIG. 3 is a flow diagram for calculating a desired temperature increase curve of the slab.

The operation of the desired temperature curve calculator unit 5 is also explained according to the flow chart shown in FIG. 3.

After starting, m different sets of the slab temperatures $T_{si}$ (i=1 ... n) for each subzone are initially estimated in steps 301. The value of m must be chosen to be greater than n+1. The step 302, the gas temperature $T_{gi}$ obtained from the equation (8) is compared with the predetermined allowable temperature $T_{g,max}$ of the furnace to determine if the gas temperature $T_{gi}$ is lower than $T_{g,max}$. In steps 303, if the answer of the step 302 is NO, then the set of $T_{si}$ is modified to new lower values. Upon an affirmative answer in step 302, $T_{si}$ is substituted in step 304 into equation (10) to produce the total fuel heat flow $W_{TJ}$ (J=1 ... m) for each of the m sets of $T_{si}$.

In step 305, every $T_{si}$ of the set for which $W_{Tj}$ is a maximum is modified toward the average $T_{si}$ of the remaining m-1 sets and based on these modified $T_{si}$, $W_{Tj}$ is recalculated from equation (8) in step 305 and this value is compared to the predetermined allowable temperature $T_{g,max}$ of the furnace to determine if the $T_{gi}$ is within the allowable range. If not, in step 307, $T_{si}$ is modified to another new and lower value.

Finally, in step 308, the magnitude of the difference between $W_{Tj}$ for each of the m sets and the averaged value $\overline{W}_{Tj}$ for all sets is compared to a predetermined constant $\epsilon$ to determine if the deviation is less than $\epsilon$. If not, the calculation reiterates to step 305 to adjust the next highest value of $W_{Tj}$. Once the gas temperatures $T_{gij}$ have converged so that any of the m sets of $T_{gij}$ produces roughly the same low fuel flow judged by the maximum deviation $\epsilon$, any of the sets describe the desired temperature profile.

The furnace temperature calculating unit in the calculator unit 6 can be understood by considering the following model. The heat balance equation in each subzone along the length of the furnace is represented by the following equation $$C \frac{dT_{gi}}{dt} = \quad (11)$$

$$Q_1 + H_g \cdot W_i + G_{i+1} \cdot C_{pg} \cdot T_{gi-1} - G_{i-1} \cdot C_{pg} \cdot T_{gi} +$$

$$\sum_{j=1}^{n} K_{1ij} \{(T_{gj} + 273)^4 - (T_{gi} + 273)^4 +$$

-continued $$\sum_{k=1}^{n} K_{2ik}\{(T_{wk} + 273)^4 - (T_{gi} + 273)^4 +$$

$$\sum_{l=1}^{m} K_{3il}\{(T_{sl} + 273)^4 - (T_{gi} + 273)^4 +$$

$$C_2 \cdot (T_{wi} - T_{gi}) + C_3 \cdot (T_{si} - T_{gi})$$

The left-hand side represents the time derivative of the heat bound up in gas within the ith subzone. The first term on the right represents the heat capacity of the fuel and air entering the subzone. The second term is the heat of reaction of the gas attributed to each subzone. The third term is the convective heat of the gas flowing from upstream into the subzone. The fourth term is the convective heat flowing downstream from the subzone. The fifth term represents the radiative heat transfer into the gas from the gas of the other subzones. The sixth term represents the radiative heat transfer into the gas from the furnace walls of all the subzones. The seventh term represents the radiative heat transfer into all the slabs from the gas in the ith subzone. The eighth and ninth terms represent the convective heat flows between the wall and the gas and the gas and the slab, respectively, in the ith subzone. In this equation, $G_i$ is the gas flow in the subzone, $K_{1ij}$, $K_{2ik}$ and $K_{3i}$ are the effective radiation conversion coefficients, C1, C2 and C3 are constants and n is the number of subzones, and m is the number of slabs, Equation (11) can be rearranged and simplified into the following equation if the wall temperatures $T_{wi}$, the slab temperatures $T_{si}$ and the fuel flows $W_i$ are already known.

$$\frac{dT_{gi}}{dt} = \sum_j A_{ij}(T_{gi} + 273)^4 + \sum_k B_{ik} \cdot T_{gk} + C_i \quad (i = 1, n) \quad (12)$$

where $A_{ij}$, $B_{ik}$ and $C_i$ are obtained from the corresponding terms of Equation (11). The new distribution of the gas temperature in the furnace can be arrived at by integrating the time derivatives of the temperatures from the temperature distribution in the furnace in the previous step, the result of this integration must be converged by use of Newton's method for equation (12).

The slab temperature calculator unit in calculator unit 6 may be explained by using the following model. The temperature $T_{se}$ of the slab along its thickness x of the slab may be represented as the following one-dimensional equation insofar as it is assumed that there are no temperature gradients along the length and width of the slab, $$\frac{dT_{se}}{dt} = \frac{\lambda}{C_p \cdot \gamma} \cdot \frac{d^2 T_{se}}{dx^2} \quad (13)$$

The boundary conditions on the surface of the slab are as follows:

$$\left.\frac{dT_{se}}{dx}\right|_{x=0} = \frac{1}{x} \sum_{i=1}^{n} K_{3il}[(T_{gi} + 273)^4 - (T_{se} + 273)^4] \quad (14)$$

$$\left.\frac{dT_{se}}{dx}\right|_{x=H/2} = 0 \quad (15)$$

where x is the distance from the surface, $C_p$ is the specific heat, $\lambda$ is the thermal conductivity, $\gamma$ is the specific gravity and H is the thickness of the slab.

The usual differencing method can be applied to equation (13) by using the boundary conditions (14) and (15) to obtain the present slab temperature distribution, more recent than that of one step before.

FIG. 4 describes the operation of the slab temperature calculating unit 6 in flow chart form where 401 constitutes the operations of the slab temperature calculating unit. In step 403, the distribution of fuel for each subzone in each zone is calculated. In step 404, the thermal heat content of the fuel and air carried into each subzone is calculated. In step 405, the reaction heat of fuel in each subzone is calculated. In step 406, the heat of the gas flowing from upstream into each subzone is calculated. In step 407, the heat of the gas flowing downstream from each subzone is calculated. In step 408, the radiative heat from the other subzones into each subzone is calculated. In step 409, the radiative heat from the wall in the furnace into each subzone is calculated. In step 410, the heat absorbed into the slab in each subzone by the thermal radiation is calculated. In step 411, the heat absorbed into the slab and the wall of furnace in each subzone by convection is calculated. In step 412, the final step in the furnace temperature calculating unit, the new distribution of the gas temperature is calculated by way of Newton's method for equation (12).

In the slab temperature calculating unit, in step 413, the heat flow into the slab is calculated according to equation (14). In step 414, the slab temperature distribution is calculated according to equation (13) by using equations (14) and (15) as the boundary conditions.

The fuel flow calculating unit 7 calculates the quantity of injected fuel flow into each zone by taking the difference $\epsilon_i$ between each present desired slab temperature produced by the desired temperature curve calculator 5 and the present average temperature of the slab (produced by the slab temperature calculating unit 6), and multiplying this difference by weight coefficients, and with the resultant product regulating the fuel control valves 4.

In FIG. 5 is shown a flow chart for the fuel flow calculating unit 7 in which step 501 shows the calculation of temperature difference $\epsilon_i$ of each slab. In step 502, the representative difference $\epsilon^*$ in each zone is calculated by averaging the differences of all the slabs presently within each zone according to the following equation $$\epsilon^* = \Sigma C_i \epsilon_i$$

where $C_i$ are weighting coefficients. In step 503, the expected fuel flow N into each zone is calculated by using $\epsilon^*$ and the present fuel flow $W_o$ according to the following equation $$N = W_o + \alpha \cdot \epsilon^*$$

where $\alpha$ is a constant.
What is claimed is:

1. A method of controlling furnace temperature for use with a slab heating furnace having a zone with controllable heating means, including the steps of:
   (a) calculating a desired temperature profile of a slab as it progresses through a furnace divided into sub-zones along its length, said calculation minimizing total fuel flow and based on shape information of said slab, slab temperature at a prior position within said furnace, and the predetermined slab temperature at a discharge position of the furnace;
   (b) predicting the distribution of the gas temperature at each said subzone along the length of the furnace;
   (c) calculating the present slab temperature distribution by using said distribution of said gas temperature predicted in step (b);
   (d) comparing said slab temperature calculated in step (c) at the present time with said desired slab temperature calculated in step (a) to produce a difference between them; and
   (e) adjusting the output of said heating means according to said temperature deviation produced in step (d);

wherein said desired temperature curve is predicted based on the $T_{si}$ which minimizes $W_T$ and said $T_{si}$ is calculated according to the equation $$W_T = \frac{1}{(H_g - T_{gi} \cdot C_{pg} \cdot C)} \left[ \sum_{i=1}^{n} \{A_i \cdot [(T_{si} + 273)^4 + E_i(T_{si+1} - T_{si-1})]^{\frac{1}{4}} - 273 + B_i\} + \sum_{i=1}^{n} \frac{C_p \cdot \gamma \cdot H \cdot v}{2 \cdot l_i} (T_{si+1} - T_{si}) \right]$$

where $W_T$ is the total injected fuel flow, $H_g$ is the heat produced per unit of fuel flow, $T_{si}$ is the slab temperature in the ith subzone, $T_{gi}$ is the temperature at the center of the ith subzone, $C_{pg}$ is the specific heat of the exhausted gas, C is a constant relating the volume of exhausted gas to the fuel flow, $A_i$ and $B_i$ are constants depending on the structure of the furnace, $T_{si}$ is the slab temperature in the ith subzone, $C_p$ is the specific heat of the slab, $E_i$ is equal to $(C_p \cdot \gamma \cdot H \cdot v)/(D_i \cdot l_i \cdot 2)$ where $\gamma$ is the specific gravity of the slab; H is the thickness of the slab, $D_i$ is the radiative heat conversion coefficient, $l_i$ is the length of the ith subzone, and v is the velocity of the moving slab.

2. A method of controlling a furnace temperature according to claim 1, wherein the step of calculating the desired temperature curve includes the step of calculating said total injected fuel when said predicted gas temperature is lower than an allowable temperature of said furnace, said predicted gas temperature $T_{gi}$ being calculated by the following equation $$T_{gi} = [(T_{si} + 273)^4 + E_i(T_{si+1} - T_{si-1})]^{\frac{1}{4}} - 273.$$

* * * * *